United States Patent [19]

Gerdes

[11] 4,294,375
[45] Oct. 13, 1981

[54] VEHICLE FUEL TANK SEALING CAP

[75] Inventor: Thedor Gerdes, Langenfeld, Fed. Rep. of Germany

[73] Assignee: Blau KG Fabrik Fur Kraftfahrzeugteile, Fed. Rep. of Germany

[21] Appl. No.: 100,159

[22] Filed: Dec. 4, 1979

[30] Foreign Application Priority Data

Dec. 4, 1978 [DE] Fed. Rep. of Germany ....... 2852454

[51] Int. Cl.³ ..................... B65D 41/06; B65D 51/18
[52] U.S. Cl. .................................. 220/293; 220/304; 220/DIG. 33
[58] Field of Search ............... 220/203, 210, 303, 293, 220/DIG. 33, 86 R, 304; 296/1 C; 215/334

[56] References Cited

U.S. PATENT DOCUMENTS

| | | | |
|---|---|---|---|
| 2,137,695 | 11/1938 | Merolle | 215/334 |
| 3,209,963 | 10/1965 | Krieps et al. | 220/306 X |
| 4,142,756 | 3/1979 | Henning | 220/86 R X |
| 4,157,766 | 6/1979 | Gerdes | 220/306 |
| 4,164,302 | 8/1979 | Gerdes | 220/210 |
| 4,168,011 | 9/1979 | Lomer | 220/303 X |
| 4,177,931 | 12/1979 | Evans | 220/DIG. 33 |

FOREIGN PATENT DOCUMENTS 164288 8/1958 Sweden ................... 215/334

Primary Examiner—Allan N. Shoap
Attorney, Agent, or Firm—William A. Drucker

[57] ABSTRACT

In a sealing cap for fuel tank pipes of motor vehicles with an outer cap (10) and an inner cover portion (12), the outer cap (10) has, at its inner side, a rib (36), made of synthetic material, which bears at least one radial lug (38) at its open end to serve as connection with the inner cover portion (12). In order to obtain a secure, torsion-proof connection between the outer cap (10) and the inner cover portion (12) during normal use and in order to facilitate a snapping off of the outer cap (10) in the case of motor vehicle accidents, the strength of the lug (38) is calculated to be low, and the torsion-proof connection between the outer cap (10) and the inner cover portion (12) is achieved by a separate positive-locking coupling (56, 58).

6 Claims, 4 Drawing Figures

VEHICLE FUEL TANK SEALING CAP

BACKGROUND OF THE INVENTION

The invention relates to a sealing cap for the fuel tank pipe for motor vehicles, with an outer cap and an inner cover portion, held in torsion-proof relationship therein, whereby the inner cover portion being cup-shaped, having a peripheral flange at its side which faces the outer cap and bearing packing means for the sealing of the pipe and comprising fastening means for engagement with the pipe, the outer cap at its reverse side, facing the inner cover portion, including an integrally molded rib of a synthetic material, having at its free end at least one inwardly-directed radial lug engaging the inner cover portion, and the outer cap being adapted to snap off from the inner cover portion whenever the outer cap is affected by forces such as they occur during a motor vehicle accident.

THE PRIOR ART

A sealing cap of this type is known from German Patent Specification No. 26 57 747 Volkswagenwerk AG. The rib portion of the outer cap has an annular lug, or several lugs, arranged at a distance from each other in the direction of the circumference and radially outwardly directed, and there is provided at the inner cover portion a sheet metal ring which is radially inward beaded in the direction of the outer cap and adjacent thereto, the beads having a C-shaped cross-section the lug or lugs of the rib reaching behind the beaded rim which is radially open towards the inside in order to connect the outer cap with the inner cover portion. In order to ensure that the outer cap can snap off in motor vehicle accidents, without undoing the tight seating of the inner cover portion on the fuel tank pipe, parts of this outer cap and certainly its rib, as well as the lug or lugs are manufactured from a weakly resilient material so that the lug or lugs may snap out of the beaded rim of the ring of the inner cover portion. Such desirable breakage under the influence of extremely strong forces affecting the outer cap should, however, be impossible under normal operating conditions.

During normal use of the cap, the connection between the outer cap and the inner cover portion must not only be tight enough to prevent a separation of the two parts, but the lug or lugs must be held tightly enough within the beaded rim of the inner cover portion so that the frictional engagement results in a sufficiently torsion-proof connection between the two. For this purpose, the rib with its lug or lugs must be held in the beaded rim under great radial prestress, and the rib as well as the lug or lugs must be highly stable so that they are not destroyed during mounting or when affected by forces resulting from normal operations, as well as the extremely high forces occurring in a motor vehicle accident. These parts must, therefore, be manufactured from a high-quality, tough, resilient synthetic material. The necessary use of such a high-quality synthetic material entails a corresponding expenditure for the synthetic material as well as for a more difficult processing thereof. In addition, the strong radial stress of the rib may lead to fatigue of the synthetic material, which means that after a certain working life, a secure connection between the outer cap and the inner cover portion, safeguarding against a snapping-off of the outer cap and against torsion between the outer cap and the inner cover portion, is no longer guaranteed.

OBJECT OF THE INVENTION

The invention is based on further developing economically a sealing cap of the initially described type in such a manner, that under normal operating stresses, a secure connection between outer cap and the inner cover portion is guaranteed while, at the same time, it is possible for the outer cap to snap off under the stress of extreme forces during motor vehicle accidents, without impairing the leakproof seating of the inner cover portion within the pipe.

The invention proposes to solve this problem by providing a sealing cap, of the initially described type, giving a sufficiently low stability to the radial lug so that it breaks off under the influence of forces acting upon the outer cap, and by providing positive locking means for a torsion-proof connection between the outer cap and the inner cover portion.

SUMMARY OF THE INVENTION

In the sealing cap of the invention, the lug of the rib constitutes a predetermined breaking point, where the outer cap separates from the inner cover portion under the influence of extremely high forces. Inasmuch as the lug is of relatively minor strength, the outer cap, if manufactured from a synthetic substance, may be made out of a synthetic material of not too high a quality and of relatively minor rigidity, which may also easily be processed or, alternatively, when using a high-quality synthetic material, a relatively minor thickness may be chosen for the area of the rib and for the lug, resulting in a reduced expenditure. Since separate positive-locking coupling means are provided for the torsion-proof connection between the outer cap and the inner cover portion, the lug at the inner cover portion does not have to be subjected to radial prestress in order to achieve a frictional engagement, so that, in this respect also, only a minor stability is required for the rib and for the lug, thereby excluding any material fatigue of these parts.

BRIEF DESCRIPTION OF THE DRAWINGS

The invention is hereinafter described in detail with reference to the accompanying drawings.

DESCRIPTION OF THE PREFERRED EMBODIMENTS

Figure 1:
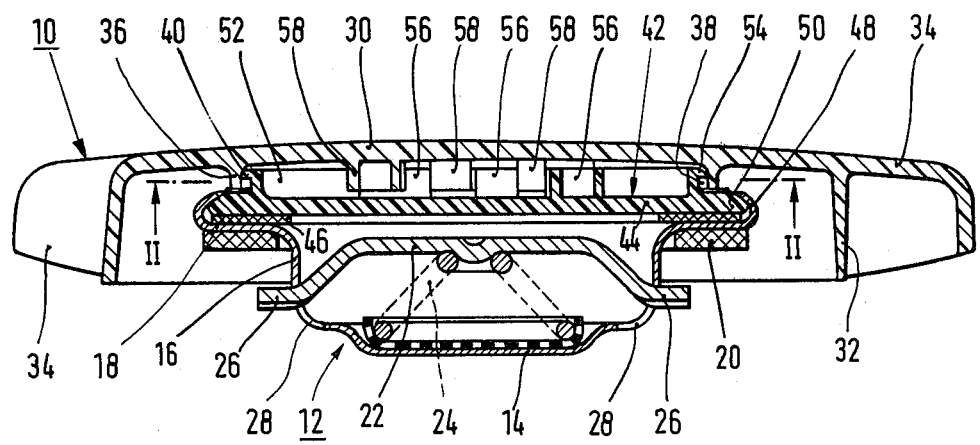
FIG. 1 shows a first embodiment of a sealing cap according to the invention in longitudinal section.
Figure 2:
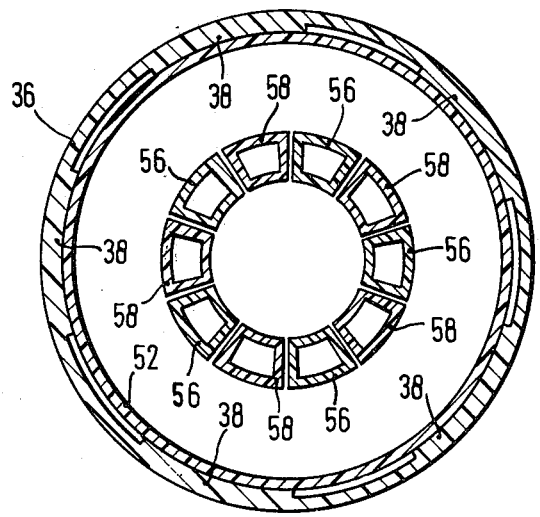
FIG. 2 shows a section through the sealing cap of FIG. 1 taken on line II—II of FIG. 1.

The sealing cap as shown in FIGS. 1 and 2 comprises an outer cap 10 and an inner cover portion 12, held torsion-proof therein. The inner cover portion 12 is cup-shaped and includes (i) a bottom 14, located at its rear end, facing away from the outer cap 10, (ii) an approximately cylindrical wall section 16 adjacent thereto, and (iii) a flange 18 adjoining at the side which faces the outer cap 10, said flange protruding radially outward and extending around the circumference, manufactured out of sheet metal. The reverse side of the flange 18 has a sealing ring 20 to keep the fuel tank (not shown) sealed. Located within the interior space of the inner cover portion 12 in the area of the wall 16, there is a bayonet bridge 22 which is prestressed in the direction of the outer cap 10 by means of a helical pressure spring 24, fixed between said bridge and the bottom 14, said bayonet bridge with its free ends 26 protruding radially outward through openings 28 provided in the wall of the inner cover portion 12, to achieve fastening within the pipe by means of curves provided at the inner rim of the pipe (not shown).

The outer cap 10 is made of synthetic material which is not too high in quality, while its stability still permits the absorption of the forces occurring during manual operation. It comprises a slightly outward bulging mid-section 30, a rim 32, extending concentrically to the flange 18 and at a distance from it towards the rear and beyond the surface of said flange, as well as radial extensions 34, with spaces provided between them for manual operation and twisting of the cap between a closed and an open position. The outer cap 10 also includes a rib 36, located at the reverse side of the wall mid-section 30 facing the inner cover portion and molded as one piece therewith and, therefore, also being made of synthetic material, the rib 36 being annular, the radial wall thickness of said rib 36 being small as compared to the thicknesses of the wall mid-section 30, the rim 32 and the extensions 34. The rib 36 has several radially inward directed lugs 38 whose radial and axial cross-sectional dimensions are small as compared to the thicknesses of the wall mid-section 30 and the lugs 34; the extensions 38 at their upper surface which faces the wall mid-section 30 each providing an arcuate support surface 40 in a plane normal to the axis of the outer cap 10.

The inner cover portion 12, at the side which faces the outer cap 10, carries an insert 42 made of synthetic material. It includes a plane disc 44 with an outer diameter equal to the diameter of the flange 18 which rests against the flange 18 next to an inserted sealing ring 46.

In order to maintain the insert 42 in an axially fixed and torsion-proof position with respect to the flange 18 the rim 48 of said flange is provided with a bead of C-shaped cross-section lying tightly against the outer rim 50 of the disc 44, said outer rim 50 being bevelled facing the outer cap 10. The rim 48 also interlocks with recesses provided in the outer rim 50 in a manner which is not shown in detail.

In addition, the insert 42 comprises a flange 52, connected in one piece with the disc 44 and extending into the inner area of the rib 36, and a lip 54, radially extending outward at the free end of said flange 52 and engaging the lugs 38. The lip 54 is bevelled at the side which faces the outer cap 10 in order to facilitate the mounting of the insert 42 within the outer cap 10, while its reverse side is annular in shape and in a plane normal to the axis of the cap so that it rests against the support surfaces 40 of the lugs 38. Even though the axial and radial dimensions of the lip 54 are the same as for the lugs 38, the lip 54 is more stable than the lugs, inasmuch as it extends continuously into the direction of the circumference, and a severance of the outer cap 10 from the inner cover portion 12 is only possible by a breaking of the lugs 38 which are intended to have a relatively minor stability by reason of the material and the dimensions selected for them.

The outer radius of the flange 52 of the insert 42, in the unassembled state of the shaped piece, is identical with the inner radius of the lugs 38. The outer diameter of the lip 54, in the unassembled state of the insert 42 is identical, with the inside diameter of the rib 36. Thus, after the assembly of the insert 42 in the outer cap 10, the extension 52 and the lip 54 do not put any radial stress on the lugs 38 and on the rib 36. In order to make it possible that, during the assembly of the insert 42, the lip 54 may lock behind the lugs 38, without the lugs 38 breaking off during the necessary radial yield of the rib 30 and/or the flange 52, the radial dimensions of the lip 54 and of the lugs 38 are very small as compared to the outer diameter of the flange 18.

Flange 52 of the insert 42 is cylindrical. At the inside of flange 52, several cams 52 are provided at a distance from each other, in the direction of the circumference, which cams extend approximately as far as the reverse side of the mid-section 30 of the outer cap 10 and are formed in one piece with the disc 44. Their radially inner and outer surfaces are located along concentric circles while their radial flanks, facing each other and pointing in the direction of the circumference, are precisely radial. In addition, at the reverse side of the mid-section 30 of the outer cap 10, there is provided an identical number of cams 58, extending approximately as far as the disc 44 of the insert 42 and occupying with their cross-section each space between two neighbouring cams 56 of the insert 42 around the circumference; as can be seen from FIG. 2, the inner radius and the outer radius of the cams 58 are identical to that of the cams 56, while the flanks of the cams 58, facing each other and pointing in the direction of the circumference, are also precisely radial, so that one flank each of a cam 56 adjoins one flank each of a neighboring cam 58. In this manner, a torsion-proof positively locking connection between the outer cap 10 and the inner cover portion 12 has been created, while there is no frictional engagement between the extensions 38 and the section 52 or its annular flange 54.

In a variation of the embodiment shown, the inner cover portion 12 could be of a closed design and, as a connecting means, it could be provided with an outer thread in the area of the wall sector 16. In this case, the sealing ring 46 might be superfluous. If however as shown in the illustrated embodiment a bridge 22 is provided, which presupposes the existence of openings 28, it is possible that fuel may enter the inner area of the inner cover portion 12. In order to prevent this fuel from escaping into the outer cap 10, the inner cover portion 12 must be leakproof. This leakproof closure is achieved by means of the insert 42, the sealing ring 46 and the above-described mounting of the insert 42 in the rim 48 of the flange 18.

Figure 3:
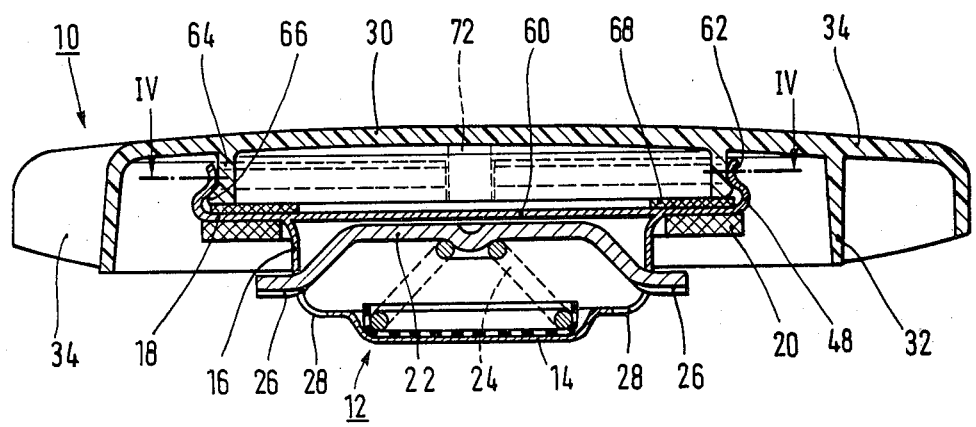
FIG. 3 shows a second embodiment of a sealing cap according to the invention, in longitudinal section.
Figure 4:
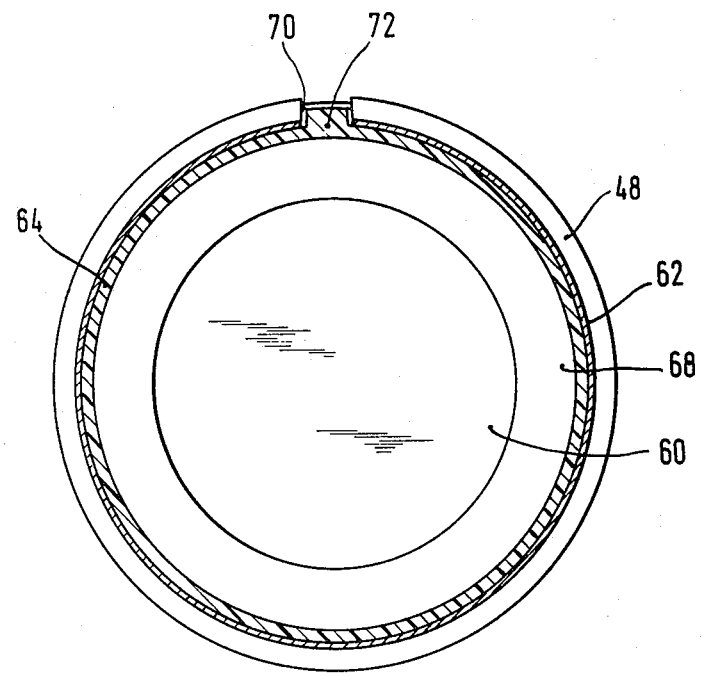
FIG. 4 shows a section through the sealing cap according to FIG. 3, taken on the line IV—IV of FIG. 3.

In the embodiment as shown in FIGS. 3 and 4, identical or equal parts are given the same reference symbols as in FIGS. 1 and 2. Thus, the inner cover portion 12 is cup-shaped, with a flange 18. However, at the elevation of the flange, there is a leakproof seal formed against the outer cap 10 by means of a wall portion 60. Also, the rim 48 of the flange is beaded radially inward towards the outer cap and adjacent thereto, the beads having a C-shaped cross-section, but there is also a ring 62 adjoining the radially inward pointing leg, said ring extending axially to the mid-section 30 of the outer cap 10 and being slightly widened at its free end.

In the embodiments shown in FIG. 3, and 4, the rim 48 directly serves as a mounting for the outer cap 10. In this case, the flange 64 provided at the reverse side of the outer cap 10 has an outer diameter which in the unassembled state is equal to the inside diameter of the ring 62 of the flange rim 48, so that in the assembled state the ring 62 lies against the outer diameter of the flange 64 without exerting any radial stress. At its free end, the hollow-cylindrical wall portion has a lip 66 which, in this case, extends radially towards the outside and engages the beaded rim 48. Between the rear free end of the flange 64 and the flange 18 there is a resilient ring 68 which largely prevents any axial motion of the extension 66 within the rim 48. While the ring 68 exerts a minor axial pressure on the extension 66 in the direction of the beaded leg of the rim 48, the resulting radial force affecting the flange 64 is very small. As a consequence, the outer cap may be snapped off from the inner cover portion 12 only by a breakage of the extension 66 along a sufficiently large portion of the circumference.

For the purpose of a positive-locking and torsion-proof coupling between the outer cap 10 and the inner cover portion 12, the beaded rim 48, including its ring 62, has a cut-out recess 70 of a width which is less than the length of the circumference, and the hollow-cylindrical flange 64 is provided with a cam 72, extending radially outward into said recess 70. The rim 48 which extends the ring 62 in the axial direction thereby enlarges the effective supporting surfaces between the rim 48 and the cam 72 along the circumference.

I claim:

1. In a sealing cap, for the fuel tank pipe of a motor vehicle, comprising:
   (i) an outer cap 10
   (ii) an inner cover portion 12, said inner cover portion 12 being cup-shaped and having a peripheral flange 18 at its side facing the outer cap 10, said cover portion 12 carrying packing means to form a seal with the fuel tank pipe, said cover portion 12 further comprising fastening means 22 for engagement with the fuel tank pipe, said outer cap 10 at its side facing the inner cover portion 12 including an integrally molded rib 36 of synthetic material having at its free end at least one inwardly-directed radial lug 38 engaging said inner cover portion 12, said outer cap 10 being adapted to snap off from said inner cover portion 12 under the influence of forces exerted on it as a result of a motor vehicle accident, the improvement which comprises:
   (a) the strength of the lug 38 is selected such that it is adapted to break under the influence of said forces,
   (b) positive anti-rotational coupling means 56, 58, 70, 72 to prevent relative rotation between said inner cover portion 12 and said outer cap 10 and provided respectively on said inner cover portion 12 and on said outer cap 10.

2. A sealing cap, as claimed in claim 1, wherein said inner cover portion 12 is provided, at its side facing said outer cap 10, with an insert 42 including a substantially planar disc portion 44, said insert 42 having a flange 52 protruding into a space bounded by said rib 36, said flange 52 having a lip 54 extending radially outwardly at its free end and engaging said at least one lug 38, the adjacent surfaces of the lugs 38 and of the lip 54 lying in a plane which is normal to the axis of rotation of the outer cap 10.

3. A sealing cap, as claimed in claim 2, wherein said flange 52 is annular, a plurality of circumferentially-spaced first cams 56 being provided in a space bounded by said flange 52 and extending axially approximately to the outer cap 10, said cams 56 having flanking surfaces which are radial, and wherein a plurality of second cams 58 are provided on the inner face of said outer cap and extend axially approximately to said disc 44, said second cams 58 being disposed in respective spaces between adjacent first cams 56.

4. A sealing cap, as claimed in claim 2 or claim 3, wherein said fastening means comprises a bayonet bridge 22 disposed within said cover portion 12 and having free ends 26 extending radially outward through openings 28 provided in said cover portion 12, and wherein said insert 42 forms a leak-proof closure between an inner space of said cup-shaped cover portion 12 and the outer cap 10.

5. A sealing cap, as claimed in claim 2, wherein said peripheral flange 18 has a peripheral bead 48 of C-shaped cross-section extending towards said outer cap 10, and wherein said insert 42 has at its face remote from said outer cap 10 a peripheral rim 50 which is of greater strength than that of the lugs 38.

6. A sealing cap, as claimed in claim 1, wherein said flange 18 of the inner cover portion 12 is made of sheet metal and is provided at its periphery with a rim 48 beaded radially inwardly towards the outer cap 10 and adjacent thereto, said beaded rim having a C-shaped cross-section, and wherein the outer diameter of the flange 64 is equal to the inner diameter of the rim, and wherein an outward facing lip 66 surrounding the flange 64 along a major part of its circumference engages said beaded rim, and wherein said beaded rim has a cut-out recess 70, and wherein said flange 64 carries a cam 62 engaging radially outwardly into said recess.

* * * * *